United States Patent [19]

Broderick et al.

[11] Patent Number: 4,906,310

[45] Date of Patent: Mar. 6, 1990

[54] PROFILED FASTENER ASSEMBLY WHICH IS HOT-EXTRUDED ON A CUFF FILM

[75] Inventors: Kevin Broderick, Victor; Fox J. Herrington, Holcomb; Donald Stell, Palmyra, all of N.Y.

[73] Assignee: Mobil Oil Corporation, New York, N.Y.

[21] Appl. No.: 287,215

[22] Filed: Dec. 21, 1988

[51] Int. Cl.$^4$ .............................................. B29C 47/06
[52] U.S. Cl. ...................................... 156/66; 24/576; 24/587; 156/244.11; 156/244.24; 156/244.25; 156/498; 156/500; 264/177.19; 264/178 R; 264/211.13; 383/63
[58] Field of Search .................... 24/576, 587; 156/66, 156/244.11, 244.24, 244.25, 498, 500; 264/177.19, 178 R, 211.13; 383/63

[56] References Cited

U.S. PATENT DOCUMENTS

| | | | |
|---|---|---|---|
| 3,462,332 | 8/1969 | Goto | 156/244.24 |
| 3,904,468 | 9/1975 | Noguchi | 156/498 X |
| 3,945,872 | 3/1976 | Noguchi | 156/498 X |
| 4,263,079 | 4/1981 | Sutrina et al. | 156/66 X |
| 4,295,919 | 10/1981 | Sutrina et al. | 156/498 |
| 4,392,897 | 7/1983 | Herrington | 156/66 |
| 4,428,788 | 1/1984 | Kamp | 156/66 |
| 4,618,383 | 10/1986 | Herrington | 156/66 |

Primary Examiner—Robert A. Dawson
Attorney, Agent, or Firm—Alexander J. McKillop; Charles J. Speciale

[57] ABSTRACT

A method of extruding a continuous profiled fastener onto a thermoplastic film substrate, and more particularly, a method for the continuous bonding of a profiled fastener assembly to a thermoplastic cuff film substrate through the intermediary of hot extrusion.

3 Claims, 1 Drawing Sheet

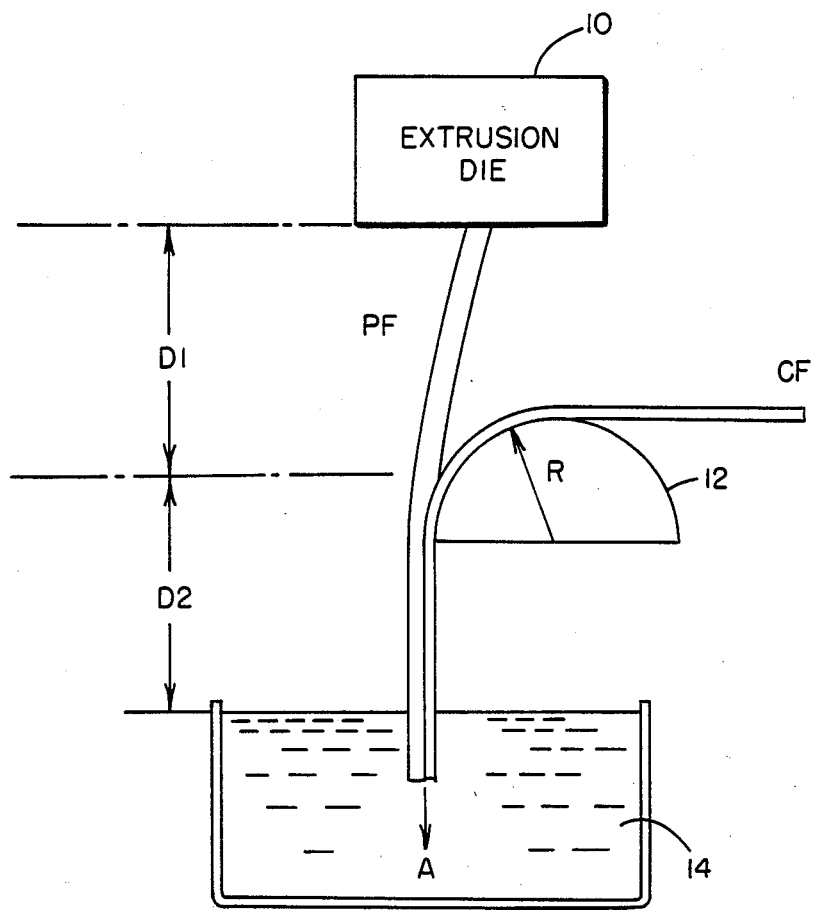

PROFILED FASTENER ASSEMBLY WHICH IS HOT-EXTRUDED ON A CUFF FILM

BACKGROUND OF THE INVENTION

1. Field of the Invention

The present invention relates to a method of extruding a continuous profiled fastener onto a thermoplastic film substrate, and more particularly, pertains to a method for the continuous bonding of a profiled fastener assembly to a thermoplastic cuff film substrate through the intermediary of hot extrusion.

In various instances, during the production the of plastic bags which are provided with interengageably reclosable profiled fasteners thereon, it is desired to attach a profiled fastener to a cuff film which is arranged at the outside of the top of the plastic bag. In essence, a zipper-like thermoplastic profiled fastener is hot-extruded onto the substrate film material, and thereafter subjected to cooling so as to resultingly produce a permanent bond between the continuous profiled fastener and the substrate film material either prior to or concurrently with the formation of the plastic bag.

Quite frequently, the profiled fasteners, which are usually in the form of plastic zippers or interengageable male and female fastener elements, are produced by extruding the profiled fasteners in the form of continuous strip from an extrusion die so as to extend downwardly into a water bath; and thereafter drying and winding the strip-like profiled fastener onto spools for storage and subsequent use. When required for the formation of reclosable bags, strip-like profiled fasteners and a cuff film are respectively unwound from their separate storage spools, heat-sealed to each other, and then rewound in an assembly on another spool, or conveyed to a bag making machine. The heat sealing is implemented by either hot air, heated wheels or reciprocating hot-bar sealers, as is known in the technology.

Although all of the foregoing methods are essentially satisfactory in operation, they necessitate complex production procedures and apparatus, which frequently renders the manufacture of the bags laborious and uneconomical from the standpoint of mass-production costs.

2. Discussion of the Prior Art

Ausnit U.S. Pat. No. 3,532,571 provides for a method and an apparatus for the forming of plastic tubing incorporating separable pressure-responsive reclosable fastener strips employed in the production of plastic bags. The fasteners are extruded and then bonded to the film substrate by the continuous application of pressure and heat. This procedure, in effect, necessitates the slitting open of the tubular film and the subsequent forming into a bag. Although basically satisfactory in forming a zipper-like or reclosable fastener assembly on a plastic film substrate, the method and apparatus pursuant to this patent is extremely complex and resultingly expensive.

Yano U.S. Pat. No. 4,555,282 discloses a method and apparatus for bonding thermoplastic profiled fasteners to a film substrate, whereby the fasteners are hot extruded, thereafter applied onto the surface of the film under the action of a chill roll, subjected to a flow of air and thereafter immersed in a water bath. This is a relatively cumbersome procedure necessitating the implementation of a plurality of process steps which renders the entire method expensive when applied to the mass production of plastic bags.

Levy U.S. Pat. No. 3,917,890 discloses a method employed in the formation of a profiled fastener which is adhered to a tape and then conveyed through a cooling tank prior to being rolled into a spool or similar configuration.

Other methods and apparatus for producing composite profiled fastener and film substrate structures are described in Kamp U.S. Pat. No. 4,428,788; Yagi U.S. Pat. No. 4,259,133; Kamp U.S. Pat. 4,306,924 and Goto U.S. Pat. No. 3,462,332.

Although all of these publications are directed to various methods and apparatus of producing composite film and profiled fastener assembly, none of these facilitate the simple structure and method in hot-bonding profiled fasteners to a cuff film as contemplated by the present invention.

Other aspects of the prior art relate to separately extruding the two mating elements of zipper-like profiled fasteners; in effect, male and female, and then winding the extruded profiled fasteners onto separate spools, thereafter unwinding and feeding them as needed into position for bonding onto an advancing web of film employed for plastic bags. The profiled fastener is supported and guided by a grooved plate while a series of narrow heated wheels are adapted to be brought into contact with the film which is located over the profiled fastener, thereby heat sealing the film to the back of the profiled fastener structure. Alternatively, the profiled fastener and film may be backed up with a plate instead of the wheels.

SUMMARY OF THE INVENTION

Accordingly, the present invention provides for a simple method of applying a profiled fastener or zipper structure onto a cuff film substrate prior to the attachment of the latter to the remaining plastic bag structure. In a preferred method of the invention for producing a reclosable thermoplastic film bag, the inventive zipper or profiled fastener and cuff film assembly is produced by either hot-fusing or sealing the profiled fastener to a continuous strip or web of the cuff film, and thereafter in a separate operation, heat sealing the profiled fastener and cuff film assembly to the bag film as the latter is being conducted into a bag making machine.

The inventive method of producing the profiled fastener and cuff film assembly contemplates extruding the profiled fastener as a continuous strip from a profiled hot extrusion die, concurrently conveying a continuous web of the cuff film at substantially the same linear speed of advance as the extruded profiled fastener strip over the surface of a back-up drum; in this instance, an aluminum bar which is curved or semi-cylindrical in cross-section, at which location the profiled fastener and the cuff film are contacted with each other, and then conveying the superimposed and hot-fused or bonded profiled fastener and cuff film arrangement downwardly into a water bath prior to being contacted with the bag film which is being conducted into a bag making machine.

The advantages over the art which are attained through the inventive method comprises in that it is not necessary to have to unwind a coiled stored profiled fastener, thereby considerably simplifying the process of manufacture and reducing the possibility of any damage being encountered by the profiled fastener structure. Additionally, spool lengths of the profiled fasteners can be of the same length as that of the cuff film rolls such that no splices bare required, inasmuch as by providing separate profiled fastener and cuff film feed stock rolls as in the prior art, it would be necessary to have both rolls run at the same time so as to necessitate the formation of splices. This requirement is avoided by the application of the inventive method.

Furthermore, a profiled fastener or zipper and cuff film assembly is generally much smoother and flatter in configuration, and the hot-fusion or bonding of a molten profiled fastener to a cuff film substrate forms a much neater seal than would a heat seal which requires a complete melting through of the film.

BRIEF DESCRIPTION OF THE FIGURE

Reference may now be had to the following detailed description of a preferred embodiment of the inventive method of fusing a profiled fastener to a cuff film substrate, taken in conjunction with the single FIGURE of accompanying drawing schematically illustrating an apparatus for hot-fusing the profiled fastener to the cuff film.

DETAILED DESCRIPTION

Referring now in more specific detail to the drawing, a profiled hot-extrusion die 10 is adapted to extrude a continuous strip or length of a profiled fastener PF which, depending upon conditions, may be either a male or a female profiled fastener, in a generally downward direction as illustrated by arrow A. As the molten profiled fastener is conducted downwardly from the orifice of the extrusion die, the surface of the fastener is adapted to contact a cuff film CF to which it is to be hot-fused, and which cuff film is advanced at a linear speed which is essentially identical with the speed of advance of the profiled fastener PF, so as to extend over an aluminum bar 12 having a curved or semi-cylindrical cross-section which is located at a predetermined distance D1 downstream of the orifice of the extrusion die 10 in the path of travel of the profiled fastener. The contacting between the molten profiled fastener PF and the surface of the cuff film substrate CF produces a fusion or hot-bonding therebetween, and after being conducted downwardly a further vertical distance D2 while joined together, the profiled fastener PF and the cuff film CF assembly are conveyed into a cooling or quenching water bath 14. Generally, pursuant to a preferred embodiment of the invention, the aluminum bar 12 over which the cuff film CF is conducted may possess a 1″ radius in cross-section when configured semi-cylindrically; while pursuant to a specific example, the profiled fastener is sealed to a strip or web of 3-mil gauge film constituting the cuff film substrate.

In a particular instance, the vertical distance D1 between the orifice of the extrusion die and the point of contact between the profiled fastener and cuff film constituted two inches, whereas the distance D2 from this point to the upper surface of the water bath 14 was three inches, with a rate of feed of about 80 feet per minute for the combined profiled fastener and cuff film assembly.

Changing the distance D1 from the orifice of the extrusion die 10 to the point of contact between the molten profiled fastener and the cuff film affects the tightness of the arrangement, with a shorter distance resulting in a looser arrangement because the legs of the profiled fastener toward to point outwardly away from each other, and conversely with a greater distance D1. The distance D1 may vary in conformance with the specific shape of the extruded profiled fastener and with the speed of advance of the profiled fastener and cuff film substrate.

The distance D2 between the point of contact of the profiled fastener PF and the cuff film CF on the aluminum bar 12 and the surface of the water bath 14, in this instance, was selected to be three inches, so as to ensure a good degree of adhesion between the profiled fastener and the cuff film. Although this distance may vary depending upon the rate of advance and the type of plastic material employed, if D2 is too short, then the molten profiled fastener would freeze upon contact with the water bath before sufficiently fusing with the surface of the cuff film CF, and adversely affecting the adhesion therebetween.

From the foregoing, it becomes readily apparent that the invention is directed to the provision of an exceedingly simple method of adhering a profiled fastener or zipper-like strip constituted of a thermoplastic material to a cuff film substrate.

While there has been shown and described what is considered to be a preferred embodiment of the invention, it will, of course, be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method for the continuous bonding of a hot-extruded profiled fastener assembly to a thermoplastic film substrate; comprising advancing a continuous web of said film substrate over a metal bar having a generally curvilinear surface configuration; concurrently hot-extruding a continuous web of a profiled fastener element constituted from a thermoplastic polymer; contacting said profiled fastener element with said film substrate while said fastener element is in a substantially molten state so as to cause said fastener element to hot-fuse with the contacting surface of said film substrate; and immersing said fused contacting fastener element and film substrate into a cooling water bath.

2. Method as claimed in claim 1, wherein said film substrate comprises a cuff film.

3. Method as claimed in claim 1, comprising regulating the distance between the extrusion and the point of contact of said fastener element with said film substrate, and the distance from said point of contact with the water bath so as to optimize the hot-bonding between said fastener element and said thermoplastic film substrate.

* * * * *